Figure 1:
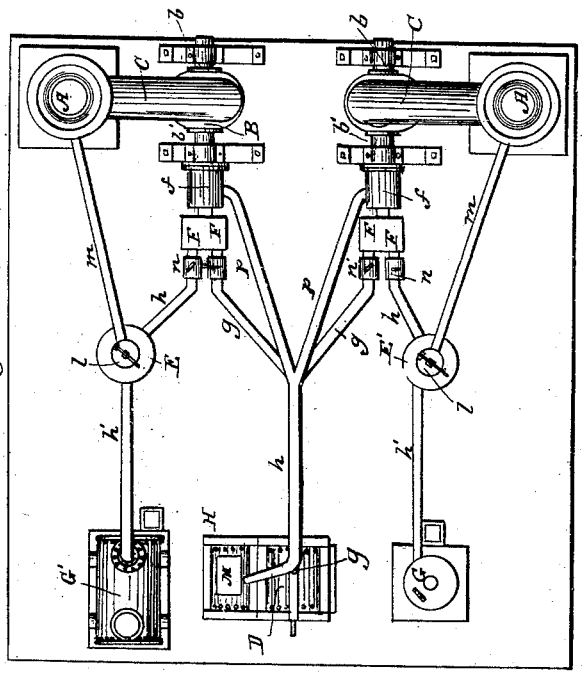

J. REESE.
Reducing Metallic Oxides.

No. 55,710.  Patented June 19, 1866.

Witnesses:

Inventor:
Jacob Reese
by his attorney
W. Bakewell

UNITED STATES PATENT OFFICE.

JACOB REESE, OF PITTSBURG, PENNSYLVANIA.

IMPROVEMENT IN REDUCING METALLIC OXIDES.

Specification forming part of Letters Patent No. 55,710, dated June 19, 1866.

*To all whom it may concern:*

Be it known that I, JACOB REESE, of the city of Pittsburg, in the county of Allegheny and State of Pennsylvania, have invented a new and useful Improved Mode of Reducing Metallic Oxides; and I do hereby declare the following to be a full, clear, and exact description thereof.

My improvement consists in a new and useful process of reducing the metallic oxides, whether of iron or other metal, by deoxidizing the ore when reduced to a liquid condition by fusion, and at the same time refining it, thereby bringing it to a metallic state in a greater or less degree of purity.

In describing the practical application of my invention I shall confine myself to its use in the manufacture of iron in its various forms of malleable or wrought iron, semi-steel, cast-steel, and crude or cast iron, without, however, designing thereby to limit myself to such application.

The most common ores of iron are oxides, and the mode ordinarily practiced for smelting or reducing them to a metallic state is to expose them, mixed with carbon in the shape of coal, coke, or wood-charcoal, to a high heat in a blast-furnace, the result being that the oxygen of the ore is removed by combustion with the carbon or fuel, (additional oxygen being supplied to aid the combustion by means of a blast of hot or cold air,) and the iron surcharged with carbon, which forms a chemical as well as a mechanical union with it, gravitates to the bottom or hearth of the furnace as a carbide of iron, in which state it is called "cast-iron."

In the process just mentioned a large amount of fuel is wasted, as will be seen when it is considered that, while cast-iron contains five per cent. of carbon, steel has only about one and a half per cent., and malleable or wrought iron theoretically none at all, or practically as little as possible, so that it becomes necessary as the next process to remove the carbon which was introduced into the iron in the blast-furnace.

In order to decarbonize the iron, various methods are employed, all depending on the reduction of the carbide of iron by depriving it of its carbon. The principal of these are the puddling or boiling process and the pneumatic process.

In the puddling process the crude iron, in the shape of pigs, is melted in a reverberating-furnace and there exposed to a current of atmospheric air, whereby the carbon is gradually taken up or burned out, until the metal granulates, when it is worked into balls, which are then removed from the furnace, hammered, and rolled in the manner well known in the art.

The pneumatic process consists in forcing a stream of atmospheric air through the molten crude iron until the carbon is burned out by the combination therewith, at a high heat, of the oxygen of the atmosphere, or so nearly burned out as to leave only the required percentage of carbon in the iron to produce steel or semi-steel, as the case may be. In this operation the direct application of fuel is not necessary, because there is sufficient carbon in the crude iron, acquired, as before stated, in the process of smelting, not only to maintain the degree of heat which the crude iron possessed when it came from the blast-furnace, but greatly to increase the heat.

In each of these processes there is a waste of fuel and iron and loss of time, arising from the fact that the ore, which is an oxide of iron, is first deoxidized and charged with carbon, and then by a second operation decarbonized by the application of oxygen.

My improvement is designed to effect the production of malleable or wrought iron from the ore in the first instance by deoxidizing the ore by means of carbon or hydrogen, or a mixture of these elements, the carbon being exhibited in such quantity only as to produce the desired result of removing the oxygen without carbonizing the metal, while the hydrogen unites with the oxygen of the ore and is burned, effecting no chemical change by combination with the iron, and therefore producing no loss of metal; or if steel or semi-steel are to be made, sufficient carbon only is added, and that in a known quantity, to effect the necessary change in the iron.

It will be seen that I dispense with both the puddling and pneumatic processes, my object being to deoxidize the iron, and not to decarbonize it; and, instead of the capricious and cumbersome blast-furnace, I substitute a process which is easily controlled to produce the desired effect.

My improved process, in addition to the saving of fuel and time which it effects, has the advantage of producing malleable or wrought iron in a liquid and molten state, which may be cast in any required shape without having first passed through the stage or condition of a carbide; and, further, that the amount of carbon given to the metal may be regulated with great precision, so as to determine the character of the resulting product.

Another great practical advantage of my process is that by the use of hydrogen gas to deoxidize the ore there is little or no loss of metal, because the hydrogen combines with the oxygen and passes off without forming any chemical combination with the iron, while it also combines with and carries off the sulphur and perhaps other impurities, whereas in the manufacture of iron by any other known process a serious waste of metal occurs by the formation of cinder.

In my improved process I first melt the iron ore by the application of heat, and then force through it, while in a molten liquid condition, carbon or hydrogen, or a hydrocarbon, in the manner hereinafter specified. The carbon may be obtained from various substances and applied in several different ways, but I prefer as most convenient the use of a hydrocarbon vapor or a liquid hydrocarbon; and in further describing the practical application of my invention I shall specify a particular substance or liquid which is used, or from which the deoxidizing vapor is obtained, and a certain arrangement and construction of apparatus for carrying the process into effect, but in so doing I desire not to limit myself to these specified details, although I may not mention the various modifications which may be successfully adopted for that purpose.

Figure 3:
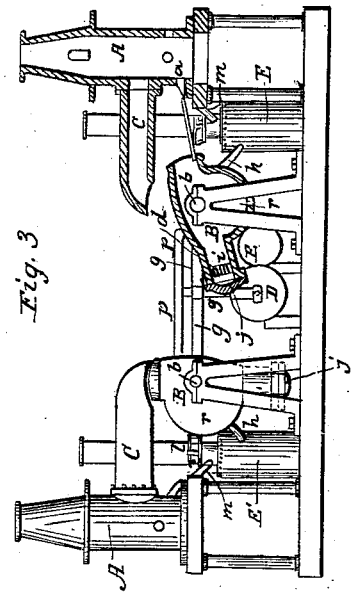
Figure 5:
Figure 2:
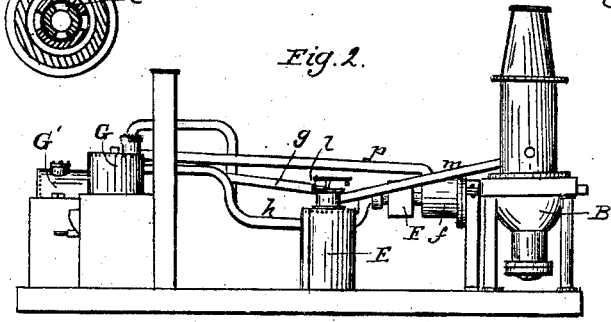
Figure 4:
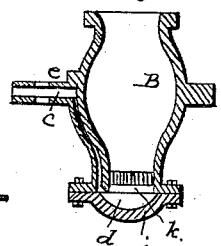

In the accompanying drawings, Figure 1 is a plan or top view of the apparatus used in my process. Fig. 2 is a vertical elevation or side view thereof. Fig. 3 is a vertical elevation or end view thereof, part of the apparatus being shown in section. Fig. 4 is a section through the axis of one of my deoxidizing chambers or reducers in a vertical plane at right angles to the plane of section of the reducer in Fig. 2. Fig. 5 is a cross-section through the hollow trunnion of the reducer, showing the valves therein.

In the several figures like letters of reference indicate similar parts.

In the drawings, A is a cupola of ordinary construction, having a tap-hole, $a$, at or near the bottom, for running out the melted ore into the deoxidizing-chamber or reducer B. C is a conductor or spout of wrought-iron, (lined with fire-clay or other refractory material.) which extends out from the body of the cupola above the hearth, so that its mouth is directly over the open top of the reducing-chamber B when the latter is in a vertical position, the object of this construction and arrangement being that the flame, together with the unconsumed carbon and hydrogen and waste heat from the reducer B, may be utilized by passing into the cupola to aid in melting the ore for the next succeeding charge.

The reducing-crucible B is made of any desired form, that shown in the drawings being preferred. It has an enlargement or belly on one side, facing the cupola, which is so constructed that when the reducer is tilted over into a nearly horizontal position, as shown at the right-hand side of Fig. 3, the melted ore may be contained in the belly without reaching up to the tuyere-holes in the bottom of the reducer.

The reducer B is made of plate-iron—say about one-half inch thick—and is lined throughout with fire-brick or similar material, so as to leave a space in the bottom of the reducer of about six inches in depth between the lining and the iron casing or shell.

The reducer is supported on trunnions $b\ b'$, one on each side, on suitable pillow-blocks. One trunnion, $b$, is solid, and the other, $b'$, is hollow, and connects with a passage, $c$, in the shell of the reducer, which passage extends down one side and opens at the bottom into the space $d$ in the lower part of the shell before referred to. This passage is shown in Fig. 4, which is a vertical section in a plane at right angles to the plane of section in Fig. 2. The cavity of the hollow trunnion $b'$ also connects, by means of a valve, $e$, in the collar $f$, with the pipe $g$, which leads to the blowing-cylinder D, and also with the pipe $h$, which leads to the receiver E, holding the deoxidizing-vapor.

The valve $e$ is constructed, as shown in Fig. 5, in such manner as that when the reducer B is in a vertical position the communication between the hollow trunnion and passage $c$ of the reducer B and the pipes $g$ and $h$ is open, and when the reducer is tilted to a nearly horizontal position to receive its charge of melted ore the communication is closed, as shown in Fig. 5.

Between the pipes $g$ and $h$ and the valve $e$ are placed two meters, F F, one of which registers the quantity of gas or deoxidizing-vapor which passes through it into the reducer B, and the other registers the amount of air forced in with the deoxidizing-vapor by the blowing-cylinder. These meters are of any ordinary construction suited to measure and record the flow of gaseous bodies, and need no particular description.

The lower end of the reducer B is provided with a removable cap, $j$, fastened on so as to be air-tight, and just above this cap $j$, inside of the reducer, at the base of the fire-brick lining, are placed five or six (more or less) ipes or tuyeres of fire-brick, $k$, the upper ends of which are flush with the interior surface of the lining of the reducer, and below which is the space $d$, before referred to, which connects with the passage $c$ up the side of the reducer to the hollow trunnion $b'$. These tuyeres may be from four to six inches in diameter and about eighteen inches long, and are perforated with holes $i$, (from five to ten in each tuyere,)

which extend lengthwise of the reducer and connect the space $c$ with the interior of the reducer. These perforations $i$ may be from three-sixteenths to five-sixteenths of an inch in diameter at top and about half an inch in diameter at the lower end.

The reducer is furnished with suitable machinery attached to the solid trunnion $b$, to turn it in its bearings, so as to tilt it over to a nearly horizontal position, with its orifice or mouth pointing to the tap-hole $a$ of the cupola to receive its charge of melted ore, which is run in through a trough, $q$.

Intermediate between the reducer B and the vaporizer G is a receiver, E, which is a receptacle of any convenient shape, made of plate-iron, and adapted to hold about five hundred cubic feet of vapor at a pressure of about fifteen pounds to the inch, more or less. A safety-valve, $l$, is attached to the vapor-receiver E, so as to allow the vapor to escape when the pressure is excessive. The safety-valve connects with a branch pipe, $m$, which conducts the escape-vapor to the cupola A, where it serves as fuel and prevents the waste which would otherwise ensue.

The vaporizer is made like a steam-boiler, either vertical (like that marked G) or horizontal, (like that marked G',) and has a furnace under it for vaporizing the petroleum contained in the vaporizer. A pipe, $h'$, carries the petroleum-vapor to the receiver E.

The blowing-cylinder D (of ordinary construction) for blowing a blast of atmospheric air has a pipe, $g$, which branches so as to connect with two reducers. The air-pipes $g$ from the blowing-cylinder and the vapor-pipes $h$ from the vapor-receiver E have each a separate valve or cock, $n\ n'$, so as to stop or regulate the flow of air or vapor into the reducer, in order that the relative quantity of each may be adjusted when a mixed blast is used.

In the apparatus shown in the drawings are two cupolas, each connected with a separate reducer, receiver, and vaporizer, the apparatus being double; but one blowing-cylinder will serve both sets.

A small force-pump, H, is placed in some convenient position, the discharge-pipe $p$ of which connects with the hollow trunnion $b'$ of each of the receivers B and B', so as to pump the liquid petroleum or other hydrocarbon used directly into the reducers through the passage $c$ and tuyere-holes $i$. When this pump is used the cocks $n\ n'$ are closed, shutting off the connection with the vapor-receivers E E'.

Having thus described the construction of the apparatus which I employ, I will proceed to explain more fully its use and operation.

It is well known that both hydrogen and carbon readily combine with oxygen, and at a proper heat ignite, and in so doing give out a further degree of heat. If, therefore, the oxide of iron (iron ore) be sufficiently heated and then exposed to the action of carbon in the shape of a carbureted vapor or otherwise, the carbon will decompose the ore and unite with the oxygen by vivid combustion, creating an intense heat, and if in this process no more than the requisite amount of carbon is employed to deoxidize the ore the result will be malleable iron in a molten condition. If semi-steel or cast-steel is required, a slight excess of carbon must be added beyond what the oxygen will consume, which excess will combine with the iron, and the result will depend on the surplus of carbon thus employed.

The same process is used with hydrogen gas, which, being forced through the melted iron ore, combines with the oxygen of the ore, which is thereby decomposed with vivid combustion and a high degree of heat. The hydrogen will not readily unite with the iron, and therefore causes no loss of metal in the process, which results in the production of malleable or wrought iron. The same result is produced by forcing the liquid hydrocarbon—such as petroleum or its vapor—through the melted ore. Petroleum, owing to its being easily vaporized and containing hydrogen as well as carbon, is peculiarly adapted to the purpose.

The peculiar advantage resulting from the use, for the purpose named, of hydrogen gas or a hydrocarbon in either a gaseous or liquid state is that, while six atoms of carbon decompose and unite with sixteen atoms of oxygen, one atom of hydrogen combines with eight atoms of oxygen, the former combination giving carbonic acid ($CO_2$) and the latter water or steam (HO.) Hydrogen is therefore three times as efficient for decomposing the ore and combining with its oxygen as the carbon.

The operation of my improved process is as follows: The oxide of iron (ore) is placed in the cupola A, together with such purifying ingredients as may be desired, and is there subjected to sufficient heat to melt it. The melted ore is then run through the tap-hole $a$ of the cupola into the open mouth of the reducer B, which is tilted over for that purpose, as shown in Fig. 3. The iron runs into the belly $r$ of the reducer B without reaching the tuyere-holes $i$; but as soon as the reducer is raised to a vertical position, as shown on the left-hand side of Fig. 3, the melted ore runs to the bottom of the reducer, covering the tuyere-holes $i$, and at the same time the deoxidizing vapor or liquid, as the case may be, rushes up through the tuyere-holes $i$ and mingles with the melted contents of the reducer, causing a violent agitation of the metal and a vivid combustion of the carbon and hydrogen with the oxygen of the ore, as before explained.

As before stated, I propose to use as the deoxidizing agent hydrogen gas or a hydrocarbon vapor or liquid hydrocarbon, such as petroleum, benzine, or gasoline; but whatever be the vehicle of carbon employed, the effect produced is due to the carbon or hydrogen or hydrocarbon entering into combination with the oxygen of the ore and decomposing it, forming carbonic acid or vapor of water, which passes off, leaving the metallic iron free. This operation is continued until the oxygen is all expelled, which will be known by the color of the flame arising from the mouth of the reducer and passing up into the conductor of the cupola, for as soon as the oxygen is exhausted and the ore ceases to yield oxygen to the carbon passed through it smoke will begin to issue from the receiver, thus giving the workmen an unerring indication of the condition of the contents of the reducer.

If the flow of deoxidizing vapor or liquid is suspended as soon as free carbon is given off from the mouth of the reducer, which indicates the extreme point of deoxidation of the metal, the contents of the reducer will be malleable or wrought iron in a melted or liquid condition, which may be poured out of the reducer into molds of any desired form or into bars or slabs of suitable shape and size for rolling.

If the vehicle of carbon used for deoxidation be continued to be passed through the molten iron in the reducer after it is thoroughly deoxidized, the iron will begin to take up and combine with some of the carbon, and steel or semi-steel will be produced, as may be required, by stopping the supply when the proper amount, as registered by the meter F, has been given. If a full charge of carbon is given to the metal, the result will be cast-iron.

If it be desired to produce cast-iron, the amount of carbureted vapor or other vehicle of carbon which is passed through the metal in the reducer after the first appearance of smoke is carefully noted, and the process is continued until from three to five per cent. of carbon has been imbibed by the deoxidized iron, according to the degree of hardness desired to be given to the metal.

A similar result may be attained by stopping the supply of the carbon to the iron as soon as it is thoroughly deoxidized and running into the metal in the reducer a sufficient quantity of carburet of iron previously melted to furnish the percentage of carbon proper to the grade of steel which it is desired to produce.

It has been already stated that the hydrocarbon used as the deoxidizing agent in my process may be forced through the melted ore in the reducer in a liquid condition by means of the force-pump H. The effect produced would be substantially the same as that resulting from the use of hydrocarbon vapor, excepting that, as petroleum (which it is proposed to use) expands to very many times its liquid volume when vaporized, the conversion of the liquid into vapor within the reducer would produce an extremely violent agitation of the metal, and should be done with care and a suitably strong apparatus. In this case, however, the machinery or apparatus necessary would be much simplified, as a force-pump of small capacity would suffice.

It may be proper to state that the lighter grades of petroleum or its products, such as benzine and gasoline, for which there is at present scarcely any demand, are preferable as deoxidizing agents in my process to the heavier hydrocarbons, because they contain a larger percentage of hydrogen, while the petroleum-tar, which is now mere refuse, containing, as it does, a greater proportion of carbon, may be used when it is desired to add carbon after deoxidation is complete, for which purpose hydrogen is useless.

It will be remarked that, although a blowing-cylinder forms part of the apparatus described in this specification, the use of atmospheric air forms no part of the process as thus far described, and is not required in the manufacture of malleable or wrought iron, semi-steel, and cast-iron; but if the finer grades of steel are to be made the process of deoxidation already described may prove too rapid for the proper refining of the metal. In such cases it may be desirable, after the metal is thoroughly deoxidized and the requisite percentage of carbon is added, to continue the process still further, which may be done by adding, after the point just stated is attained, sufficient air to the carbon vapor or hydrocarbon vapor or hydrogen gas to support its combustion, there being no longer any oxygen in the iron for that purpose. This is done by turning the cock $n'$ and allowing a sufficient amount of air to enter the passage $c$ of the reducer to form a combustible mixed blast in such proportion to the carbon as will keep up the necessary heat to refine the steel without either adding to or diminishing the amount of carbon held in chemical combination with the metal, the air being employed, not to produce any oxidation of the metal, but to supply, by its union with the carbon of the blast, the necessary fuel and prevent the further carbonizing of the metal. If the deoxidation of the ore is effected by the use of the liquid petroleum or hydrocarbon, water instead of air may be mixed with it after the oxygen is all expelled from the metal.

Having thus described my improved process for reducing metallic oxides, what I claim as my invention, and desire to secure by Letters Patent, is—

1. Deoxidizing metallic oxides while in a molten or liquid condition by means of hydrogen gas or a vapor of carbon or of hydrocarbon, or a mixture of such vapor or gas, so that these oxides or ores may be reduced to a metallic condition without the use of additional fuel, substantially in the manner hereinbefore described.

2. The use of liquid petroleum or other liquid hydrocarbon in the manufacture of iron or steel and other metals, substantially in the manner and for the purposes hereinbefore described.

3. The use of hydrogen gas for the purpose of deoxidizing metallic oxides, substantially in the manner hereinbefore described.

4. Making liquid wrought or malleable iron from the ore by subjecting the ore while in a melted condition to the action of hydrogen gas, or hydrocarbureted vapor, or a vapor of carbon, or a liquid hydrocarbon, substantially as hereinbefore described.

5. Making cast-steel by deoxidizing iron ore while in a melted condition, in the manner hereinbefore described, and subjecting the pure iron thus produced to a vapor of carbon or hydrocarbon, or adding thereto a liquid carburet or hydrocarbon, until the requisite amount of carbon is added, substantially as hereinbefore described.

6. Making cast-iron by deoxidizing iron ore in a melted condition, in the manner described, and supplying the requisite amount of carbon in a gaseous or liquid form, substantially as hereinbefore set forth.

7. Refining iron and steel by means of a carbon in a gaseous or liquid form, to which, after the metal has been deoxidized thereby, a sufficient amount of air, water, or steam is added to support the combustion of the carbon thus added as fuel to the melted metal.

8. Making a belly in the lower side of the deoxidizing-chamber or reducer, so as to hold the charge of melted ore away from the tuyere-holes in the bottom of the reducer until the reducer is raised to admit the deoxidizing vapor or liquid, substantially as hereinbefore described.

9. The use of a valve on one of the trunnions of the reducer, constructed, substantially as hereinbefore described, so as to shut off the deoxidizing vapor or liquid from entering the reducer when in position to receive its charge and open the communication when the reducer is restored to its position for working.

10. The use of gas-meters, in combination with the air-cylinder and vapor-generator and reducer, for the purpose of measuring the amount of deoxidizing vapor or air admitted to the interior of the reducing-chamber, substantially as hereinbefore described.

In witness whereof I, the said JACOB REESE, have hereunto set my hand.

JACOB REESE.

In presence of—
ALLAN C. BAKEWELL,
W. D. LEWIS.